US012425790B2

(12) United States Patent
Yamamoto

(10) Patent No.: US 12,425,790 B2
(45) Date of Patent: Sep. 23, 2025

(54) INFORMATION PROCESSING APPARATUS, INFORMATION PROCESSING METHOD, AND TERMINAL DEVICE

(71) Applicant: SONY GROUP CORPORATION, Tokyo (JP)

(72) Inventor: Yuki Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 334 days.

(21) Appl. No.: 18/004,736

(22) PCT Filed: Jun. 28, 2021

(86) PCT No.: PCT/JP2021/024269
§ 371 (c)(1),
(2) Date: Jan. 9, 2023

(87) PCT Pub. No.: WO2022/014308
PCT Pub. Date: Jan. 20, 2022

(65) Prior Publication Data
US 2023/0254656 A1 Aug. 10, 2023

(30) Foreign Application Priority Data
Jul. 15, 2020 (JP) ................................ 2020-121446

(51) Int. Cl.
*H04S 7/00* (2006.01)

(52) U.S. Cl.
CPC .............. *H04S 7/302* (2013.01); *H04S 7/301* (2013.01); *H04S 2400/11* (2013.01); *H04S 2420/01* (2013.01)

(58) Field of Classification Search
CPC ...... H04S 7/302; H04S 7/301; H04S 2400/11; H04S 2420/01
See application file for complete search history.

(56) References Cited

U.S. PATENT DOCUMENTS 6,766,028 B1 * 7/2004 Dickens .................. H04S 3/004 381/74
2019/0215637 A1 * 7/2019 Lee ......................... H04S 7/304

FOREIGN PATENT DOCUMENTS

JP 2013-101248 A 5/2013
JP 2019-146160 A 8/2019
JP 2020-088632 A 6/2020
WO 2015/107926 A1 7/2015
(Continued)

OTHER PUBLICATIONS

International Search Report and Written Opinion of PCT Application No. PCT/JP2021/024269, issued on Aug. 31, 2021, 10 pages of ISRWO.

*Primary Examiner* — David L Ton
(74) *Attorney, Agent, or Firm* — CHIP LAW GROUP

(57) ABSTRACT

Provided is an information processing apparatus that includes a correction unit that renders audio data including position information of a sound object to a plurality of virtual speakers virtually arranged in a space, and an acquisition unit that acquires first position information regarding virtual positions of the virtual speakers in the space and second position information regarding positions of the virtual speakers in the space perceived by a user. The correction unit corrects the first position information of at least one of the plurality of virtual speakers on the basis of the second position information.

13 Claims, 12 Drawing Sheets

(56) References Cited

FOREIGN PATENT DOCUMENTS

| | | | |
|---|---|---|---|
| WO | 2020/075622 | A1 | 4/2020 |
| WO | 2020/080099 | A1 | 4/2020 |

* cited by examiner

120

| VIRTUAL SPEAKER ID | USER ID | VIRTUAL SPEAKER POSITION | HRTF | ... |
|---|---|---|---|---|
| SP11 | U11 | VIRTUAL SPEAKER POSITION #11 | HRTF#11 | ... |
| SP12 | U11 | VIRTUAL SPEAKER POSITION #12 | HRTF#12 | ... |
| ... | ... | ... | ... | ... |

INFORMATION PROCESSING APPARATUS, INFORMATION PROCESSING METHOD, AND TERMINAL DEVICE

CROSS REFERENCE TO RELATED APPLICATIONS

This application is a U.S. National Phase of International Patent Application No. PCT/JP2021/024269 filed on Jun. 28, 2021, which claims priority benefit of Japanese Patent Application No. JP 2020-121446 filed in the Japan Patent Office on Jul. 15, 2020. Each of the above-referenced applications is hereby incorporated herein by reference in its entirety.

FIELD

The present disclosure relates to an information processing apparatus, an information processing method, and a terminal device.

BACKGROUND

There is known a technique of stereoscopically reproducing a sound image in a headphone or the like by using a head-related transfer function (Hereinafter, referred to as "Head Related Transfer Function: HRTF" appropriately) that mathematically represents how sound reaches from a sound source to an ear.

Since the HRTF has a large individual difference, it is desirable to use the HRTF for each individual at the time of use. For this purpose, for example, a technique for estimating the HRTF on the basis of an image of a user's auricle is known.

CITATION LIST

Patent Literature

Patent Literature 1: WO 2020/075622 A

SUMMARY

Technical Problem

However, in the conventional technique, there is room for promoting further improvement in usability. For example, in the conventional technique, since the HRTF is estimated, an error from the actual HRTF may occur, and there is a possibility that sound quality is impaired when a sound image is reproduced.

Therefore, the present disclosure proposes a new and improved information processing apparatus, information processing method, and terminal device capable of promoting further improvement in usability.

Solution to Problem

According to the present disclosure, an information processing apparatus includes: a correction unit that renders audio data including position information of a sound object to a plurality of virtual speakers virtually arranged in a space; and an acquisition unit that acquires first position information regarding virtual positions of the virtual speakers in the space and second position information regarding positions of the virtual speakers in the space perceived by a user, wherein the correction unit corrects the first position information of at least one of the plurality of virtual speakers based on the second position information.

DESCRIPTION OF EMBODIMENTS

Figure 1:
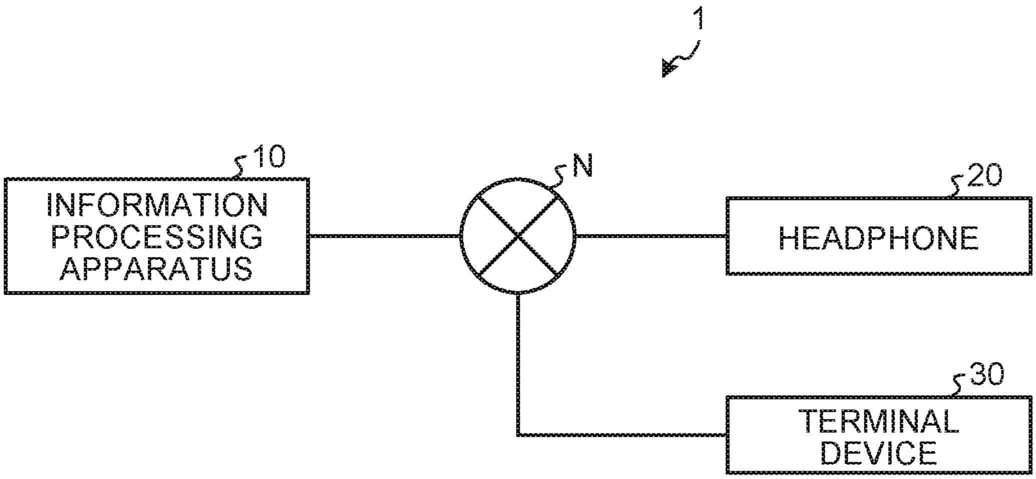
FIG. 1 is a diagram illustrating a configuration example of an information processing system according to an embodiment.

Hereinafter, preferred embodiments of the present disclosure will be described in detail with reference to the accompanying drawings. Note that, in the present specification and the drawings, components having substantially the same functional configuration are denoted by the same signs, and redundant description is omitted.

Note that the description will be given in the following order.

1. One embodiment of the present disclosure
1.1. Introduction
1.2. Configuration of information processing system
2. Function of information processing system
2.1. Overview
2.2. Functional configuration example
2.3. Processing of information processing system
2.4. Processing variations
3. Hardware configuration example
4. Summary

1. Embodiment of the Present Disclosure

1.1. Introduction

The HRTF expresses, as a transfer function, a change in sound generated by a peripheral object including a shape of a human auricle, head or the like. In general, measurement data for obtaining the HRTF is acquired by measuring an acoustic signal (audio signal) for measurement using a microphone, a dummy head microphone, or the like worn by a human in an auricle.

For example, an HRTF used in a technique such as 3D sound is often calculated by using measurement data acquired by a dummy head microphone or the like, an average value of measurement data acquired from many humans, or the like. However, since the HRTF has a large individual difference, it is desirable to use the user's own HRTF in order to realize a more effective sound production effect.

In relation to the above technique, for example, a technique for estimating an HRTF on the basis of an image of a user's auricle is known (Patent Literature 1). However, in the conventional technique, there is a possibility that sound quality is impaired when a sound image is reproduced, and thus there is room for promoting further improvement in usability.

In recent years, development of a multi-channel sound in which reproduction capability of two-channel stereo is expanded in a three-dimensional direction has become widespread. 3D-Audio in the MPEG-H 3D-Audio standard can reproduce three-dimensional sound directions, distances, spreads, and the like, so that reproduction with more realistic feeling can be performed as compared with conventional stereo reproduction.

In relation to the above technique, for example, a technique of obtaining a speaker signal (virtual speaker signal) by rendering object data (for example, metadata of an acoustic signal or position information of a sound object) of 3D-Audio in a plurality of virtual speakers whose positions are determined in advance by vector based amplitude panning (VBAP) which is an example of a three-dimensional acoustic panning method is known. In VBAP, amplitude panning is performed by dividing a reproduction space into a triangular region including three speakers and distributing a sound source signal to each speaker by a weight coefficient. Furthermore, in connection with the above technique, for example, a technique of applying a previously held HRTF to a speaker signal for each virtual speaker to obtain a headphone signal (headphone reproduction signal) for each virtual speaker including L (Left: L) and R (Right: R) signals is known. Then, in connection with the above technique, for example, a technique is known in which the headphone signal for each virtual speaker is added (summed) for each of the L and R signals for all the virtual speakers to obtain the headphone signal. As described above, in the conventional technique, for example, by obtaining a signal reproduced from the headphones using the above-described technique, it is possible to reproduce 3D-Audio with the headphones. However, in the conventional technique, there is a case where the sound image is not localized at a predetermined position, and there is a possibility that sound quality is impaired, and thus there is room for promoting further improvement in usability.

Therefore, the present disclosure proposes a new and improved information processing apparatus, information processing method, and terminal device capable of promoting further improvement in usability.

1.2. Configuration of Information Processing System

A configuration of an information processing system 1 according to an embodiment will be described. FIG. 1 is a diagram illustrating a configuration example of the information processing system 1. As illustrated in FIG. 1, the information processing system 1 includes an information processing apparatus 10, a headphone 20, and a terminal device 30. Various devices can be connected to the information processing apparatus 10. For example, the headphone 20 and the terminal device 30 are connected to the information processing apparatus 10, and information cooperation is performed between the respective devices. The information processing apparatus 10, the headphone 20, and the terminal device 30 are connected to an information communication network by wireless or wired communication so as to mutually perform information/data communication and operate in cooperation. The information communication network may include the Internet, a home network, an Internet of Things (IoT) network, a Peer-to-Peer (P2P) network, a proximity communication mesh network, and the like. The wireless communication can use, for example, Wi-Fi, Bluetooth (registered trademark), or a technology based on a mobile communication standard such as 4G or 5G. For the wired communication, a power line communication technology such as Ethernet (registered trademark) or power line communications (PLC) can be used.

The information processing apparatus 10, the headphone 20, and the terminal device 30 may be separately provided as a plurality of computer hardware devices on so-called on-premises, an edge server, or a cloud, or the functions of a plurality of arbitrary devices among the information processing apparatus 10, the headphone 20, and the terminal device 30 may be provided as the same device. For example, the information processing apparatus 10, the headphone 20, and the terminal device 30 may be provided as devices in which the information processing apparatus 10 and the headphone 20 integrally function and communicate with the terminal device 30. Furthermore, for example, the information processing apparatus 10 and the terminal device 30 may be realized such that the information processing apparatus 10 and the terminal device 30 integrally function in the same terminal such as a smartphone. Moreover, the user can mutually perform information/data communication with the information processing apparatus 10, the headphone 20, and the terminal device 30 via a user interface (including a graphical user interface: GUI) and software (including computer programs (Hereinafter, also referred to as a program)) operating on a terminal device (personal device such as a personal computer (PC) or a smartphone including a display as an information display device, voice, and keyboard input) not illustrated.

(1) Information Processing Apparatus 10

The information processing apparatus 10 is an information processing apparatus that performs processing of rendering audio data including position information of a sound object to a plurality of virtual speakers virtually arranged in space. Furthermore, the information processing apparatus 10 corrects position information regarding the virtual positions of the virtual speakers in the space. As a result, since the information processing apparatus 10 can localize a sound image of the sound object at an intended position, it is possible to reduce the possibility that the sound quality is impaired. As a result, the information processing apparatus 10 can promote further improvement in usability.

Furthermore, the information processing apparatus 10 also has a function of controlling the overall operation of the information processing system 1. For example, the information processing apparatus 10 controls the overall operation of the information processing system 1 on the basis of information cooperated between the devices. Specifically, the information processing apparatus 10 corrects the position information of the virtual speakers on the basis of the information transmitted from the terminal device 30.

The information processing apparatus 10 is realized by a personal computer (PC), a server (Server), or the like. Note that the information processing apparatus 10 is not limited to a PC, a server, or the like. For example, the information processing apparatus 10 may be a computer hardware device such as a PC or a server in which a function as the information processing apparatus 10 is mounted as an application.

The information processing apparatus 10 may be any apparatus as long as the processing in the embodiment can be realized. Furthermore, the information processing apparatus 10 may be an apparatus such as a smartphone, a tablet terminal, a notebook PC, a desktop PC, a mobile phone, or a PDA. Note that, hereinafter, in the embodiment, the information processing apparatus 10 and the terminal device 30 may be realized by the same terminal such as a smartphone.

(2) Headphone 20

The headphone 20 is used by the user to listen to the audio. For example, the headphone 20 is a headphone having a member that can contact the user's ear and provide audio as a configuration. For example, the headphone 20 is a headphone having, as a configuration, a member capable of separating a space including the user's eardrum from the outside world. When reproduced by the user, the headphone 20 outputs, for example, two-channel headphone signals for L and R.

The headphone 20 is not limited to the headphone, and may be any device as long as it can provide audio. For example, the headphone 20 may be an earphone or the like.

(3) Terminal Device 30

The terminal device 30 is an information processing apparatus used by a user. The terminal device 30 may be any device as long as the processing in the embodiment can be realized. Furthermore, the terminal device 30 may be a device such as a smartphone, a tablet terminal, a notebook PC, a desktop PC, a mobile phone, or a PDA.

2. Function of Information Processing System

The configuration of the information processing system 1 has been described above. Next, functions of the information processing system 1 will be described.

Hereinafter, in the embodiment, a virtual speaker will be described, but the present invention is not limited to the virtual speaker, and any device may be used as long as the device provides a virtual sound.

Hereinafter, in the embodiment, position information regarding a virtual position of the virtual speaker in the space is appropriately referred to as "first position information". Furthermore, hereinafter, in the embodiment, position information regarding a position in the space of the virtual speaker perceived by the user is appropriately referred to as "second position information".

The HRTF according to the embodiment is not limited to the HRTF based on the measurement data actually measured as the HRTF of the user. For example, the HRTF according to the embodiment may be an HRTF of a target user (target user) that is an average HRTF based on HRTFs of a plurality of the users. As another example, the HRTF according to the embodiment may be an HRTF estimated from imaging information such as an ear image. Note that, in the embodiment described below, the HRTF is used, but not limited to the HRTF, a binaural room impulse response (BRIR) may be used. Furthermore, the HRTF according to the embodiment may be of any type as long as the transmission characteristic of the sound reaching the user's ear from a predetermined position in the space is measured as an impulse response.

2.1. Overview

Figure 2:
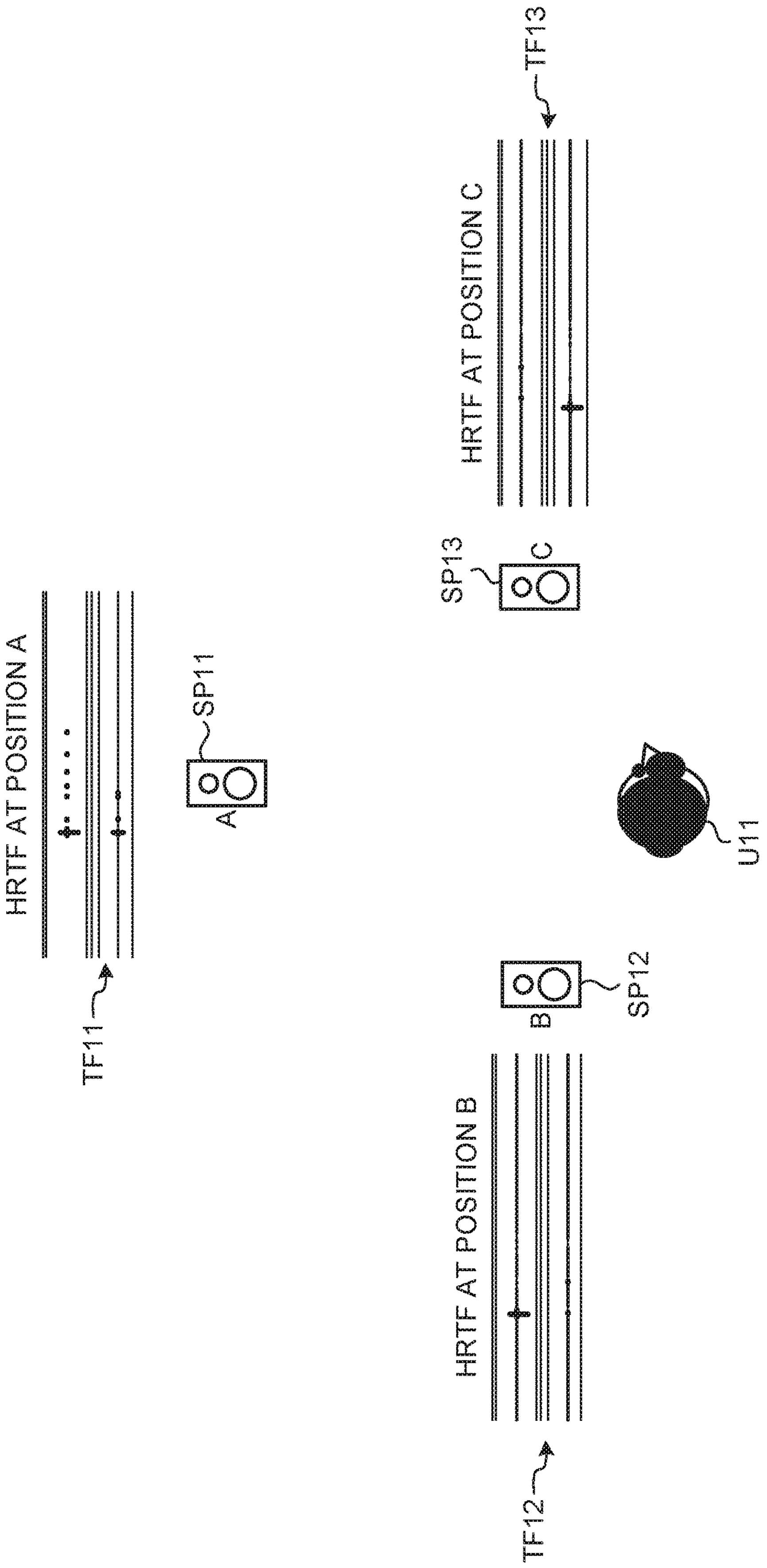
FIG. 2 is a diagram illustrating an outline of an acoustic space according to the embodiment.

FIG. 2 is a diagram illustrating an outline of an acoustic space according to the embodiment. In FIG. 2, an acoustic space is provided to a user U11 using three virtual speakers (speakers SP11 to SP13). Note that the user U11 reproduces the audio signals from the speakers SP11 to SP13 through a headphone HP11. Here, the speakers SP11 to SP13 are assumed to be located at positions A to C, respectively. The positions A to C are the first position information of each virtual speaker. Furthermore, data TF11 to data TF13 indicate the HRTFs from the positions A to C, respectively. Specifically, the data TF11 to the data TF13 indicate characteristics imitating transmission characteristics from a predetermined position A to a predetermined position C to an eardrum of the user U11, respectively.

In the prior art, the HRTF may be held for each of the positions A to C. Note that the HRTF is, for example, impulse responses for L and R such as a headphone. In the prior art, for example, when the HRTF at the position A is applied to a certain one-channel acoustic signal, two-channel acoustic signals may be obtained. The L signal among the two-channel acoustic signals is a result of performing convolution processing on the input one-channel acoustic signal with the L impulse response of the HRTF. Similarly, the R signal of the two-channel acoustic signals is a result of performing convolution processing with the R impulse response. Here, since the HRTF has characteristics simulating transmission characteristics from a predetermined position to the eardrum of a human, when the audio signal is reproduced by the headphone HP11, the user U11 perceives that the sound is localized at the position A, for example.

Figure 3:
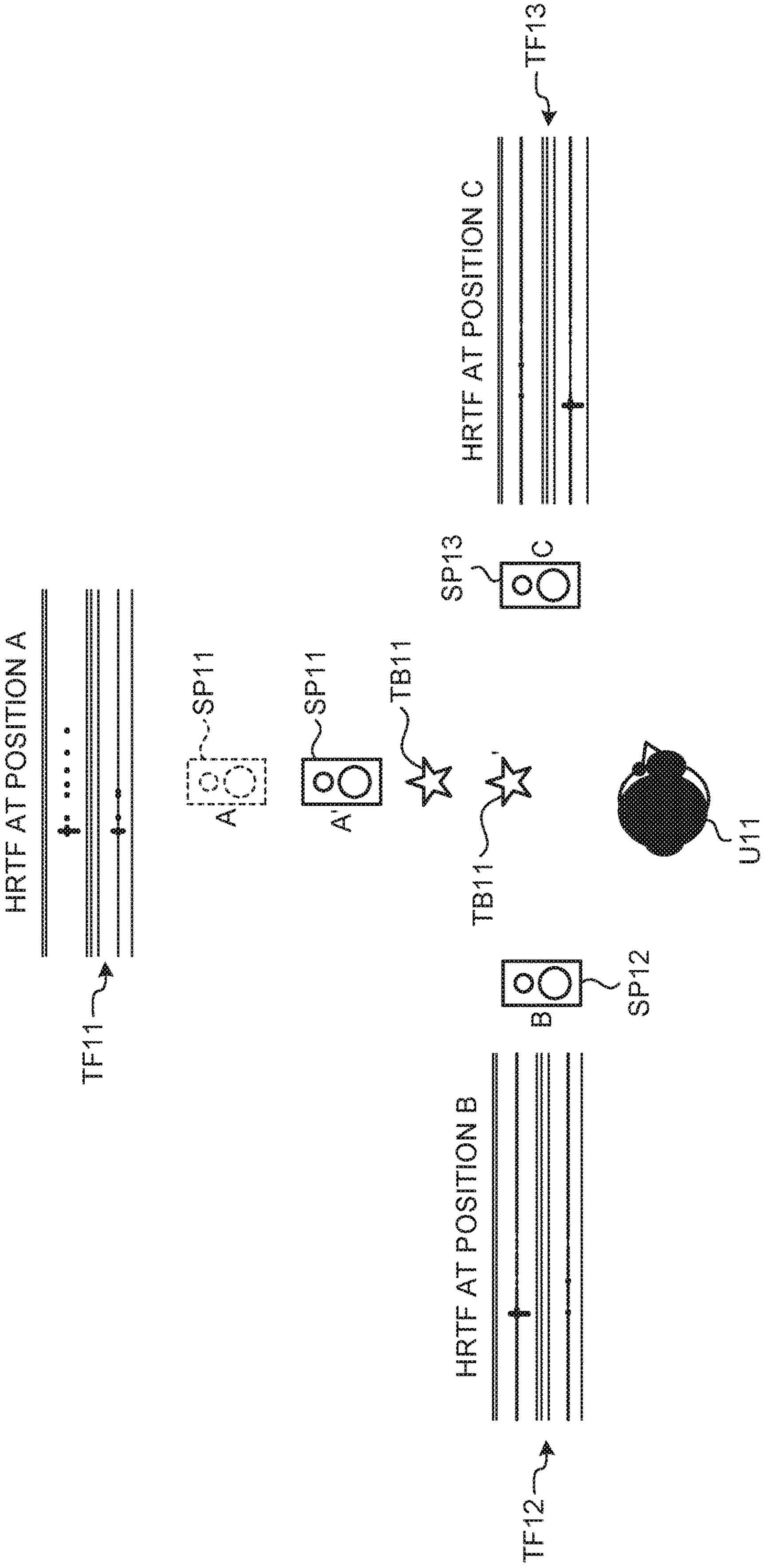
FIG. 3 is a diagram illustrating an outline of the acoustic space according to the embodiment.

FIG. 3 is a diagram illustrating an outline of an acoustic space according to the embodiment. Here, FIG. 2 illustrates a case where the sound is localized at a predetermined position, but FIG. 3 illustrates a case where the sound is not localized at a predetermined position. Note that the same description as in FIG. 2 will be omitted as appropriate. Furthermore, in FIG. 3, the speaker SP11 will be described as a virtual speaker (Hereinafter, the virtual speaker is appropriately referred to as a "reproduction target virtual speaker") to be rendered. Since the HRTF depends on the shape of the human head, the shape of the auricle, the shape of the ear canal, and the like, the HRTF held in advance may not match the HRTF of the user. In FIG. 3, since the HRTF held in advance does not match the HRTF of the user U11, for example, the sound image is localized at a position A prime different from the position A. This position A prime is second position information of the speaker SP1 perceived by the user. In this case, the user U11 perceives the speaker SP11 not at the original position A but at the position A prime. Furthermore, for example, in a case where a headphone signal is obtained by rendering a sound object TB11 having the position information of a barycentric position ☆ of the triangular region of the positions A to C using the conventional technique, the perception position of the position A of the user U11 is the position A prime, and thus the perception position of the sound object TB11 may also be a position ☆ prime instead of the position ☆. Here, the perception position becomes the position prime because the user perceives the position A as the position A prime after a gain of each virtual speaker becomes the same by VBAP. For this reason, there is a case where the sound object TB11 cannot be perceived at an originally intended position, and thus there is a possibility that the sound quality is impaired.

2.2. Functional Configuration Example

Figure 4:
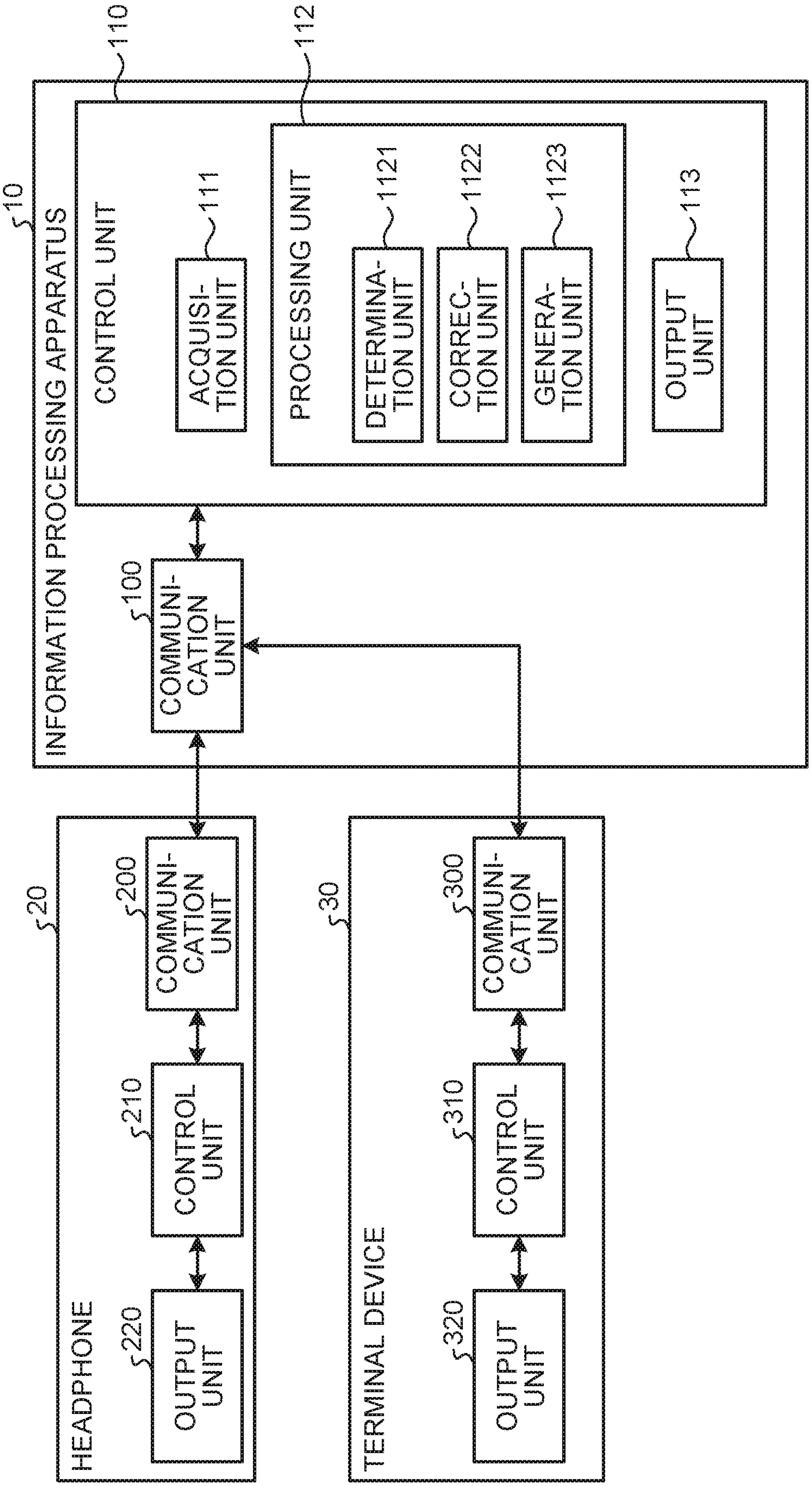
FIG. 4 is a block diagram illustrating a configuration example of the information processing system according to the embodiment.

FIG. 4 is a block diagram illustrating a functional configuration example of the information processing system 1 according to the embodiment.

(1) Information Processing Apparatus 10

As illustrated in FIG. 4, the information processing apparatus 10 includes a communication unit 100 and a control unit 110. Note that the information processing apparatus 10 includes at least the control unit 110.

(1-1) Communication Unit 100

The communication unit 100 has a function of communicating with an external device. For example, in communication with the external device, the communication unit 100 outputs information received from the external device to the control unit 110. Specifically, the communication unit 100 outputs information received from the terminal device 30 to the control unit 110. For example, the communication unit 100 outputs the second position information of the virtual speakers to the control unit 110.

In communication with the external device, the communication unit 100 transmits information input from the control unit 110 to the external device. Specifically, the communication unit 100 transmits, to the terminal device 30, information regarding acquisition of the information regarding the perception positions of the virtual speakers input from the control unit 110. The communication unit 100 may be configured by a hardware circuit (such as a communication processor), and configured to perform processing by a computer program running on the hardware circuit or another processing device (such as a CPU) that controls the hardware circuit.

(1-2) Control Unit 110

The control unit 110 has a function of controlling an operation of the information processing apparatus 10. For example, the control unit 110 performs processing for correcting the first position information on the basis of the second position information.

In order to realize the above-described function, the control unit 110 includes an acquisition unit 111, a processing unit 112, and an output unit 113 as illustrated in FIG. 4. The control unit 110 may be constituted by a processor such as a CPU, and may read software (a computer program) for realizing each function of the acquisition unit 111, the processing unit 112, and the output unit 113 from a storage unit 120 to perform processing. Furthermore, one or more of the acquisition unit 111, the processing unit 112, and the output unit 113 can be configured by a hardware circuit (processor or the like) different from the control unit 110, and can be configured to be controlled by a computer program operating on another hardware circuit or the control unit 110.

Acquisition Unit 111

The acquisition unit 111 has a function of acquiring first position information of the virtual speakers. For example, the acquisition unit 111 acquires the first position information of the plurality of virtual speakers. Furthermore, the acquisition unit 111 acquires second position information of the virtual speakers perceived by the user. For example, the acquisition unit 111 acquires the second position information of reproduction target virtual speakers. Furthermore, for example, the acquisition unit 111 acquires the second position information of the virtual speakers on the basis of input information input by the user during reproduction of an output signal (for example, a headphone signal) from an audio output unit such as a headphone.

The acquisition unit 111 acquires HRTF data of the user held at the positions of the virtual speakers. For example, the acquisition unit 111 acquires the HRTF data obtained by measuring the transmission characteristics of the sound reaching the user's ear from each virtual speaker as the impulse response.

The acquisition unit 111 acquires position information of one or more sound objects. Note that the sound object is assumed to be located within a predetermined range configured on the basis of the plurality of pieces of first position information. Furthermore, the acquisition unit 111 acquires information regarding the perception position of the sound object.

Processing Unit 112

The processing unit 112 has a function for controlling processing of the information processing apparatus 10. As illustrated in FIG. 4, the processing unit 112 includes a determination unit 1121, a correction unit 1122, and a generation unit 1123. The determination unit 1121, the correction unit 1122, and the generation unit 1123 included in the processing unit 112 may be each configured as an independent computer program module, or a plurality of functions may be configured as one collective computer program module.

Determination Unit 1121

The determination unit 1121 has a function of determining the second position information. Here, the determination of the second position information will be described using the following two methods as examples.

(1) User Specifies Perception Position

The determination unit 1121 may determine the second position information on the basis of the line-of-sight information based on the imaging information captured while directing the terminal device 30 in a direction of the sound object perceived by the user. Specifically, the determination unit 1121 may determine the second position information by holding the terminal device 30 in a direction in which the sound reproduced by the headphone 20 is localized while the user directs an imaging member such as a camera toward the face of the user with the terminal device 30 having an imaging function. In this case, the determination unit 1121 may determine the second position information by calculating in which direction the user holds the terminal device 30 from an angle of the face of the user.

The determination unit 1121 may determine the second position information on the basis of geomagnetic information detected by the terminal device 30 while directing the terminal device 30 having a rod shape in the direction of the sound object perceived by the user. Specifically, the determination unit 1121 may determine the second position information by having the rod-shaped terminal device 30 in which the geomagnetic sensor is mounted in a direction in which the sound reproduced by the headphone 20 is localized. In this case, the determination unit 1121 may determine the second position information by calculating a sensor value of the geomagnetic sensor. In this manner, the determination unit 1121 may determine the second position information on the basis of the sensor information of the terminal device 30.

The determination unit 1121 may determine the second position information on the basis of a method capable of designating a position intended by the user, such as graphical user interface (GUI) software.

Figures 5A, 5B, 5C:
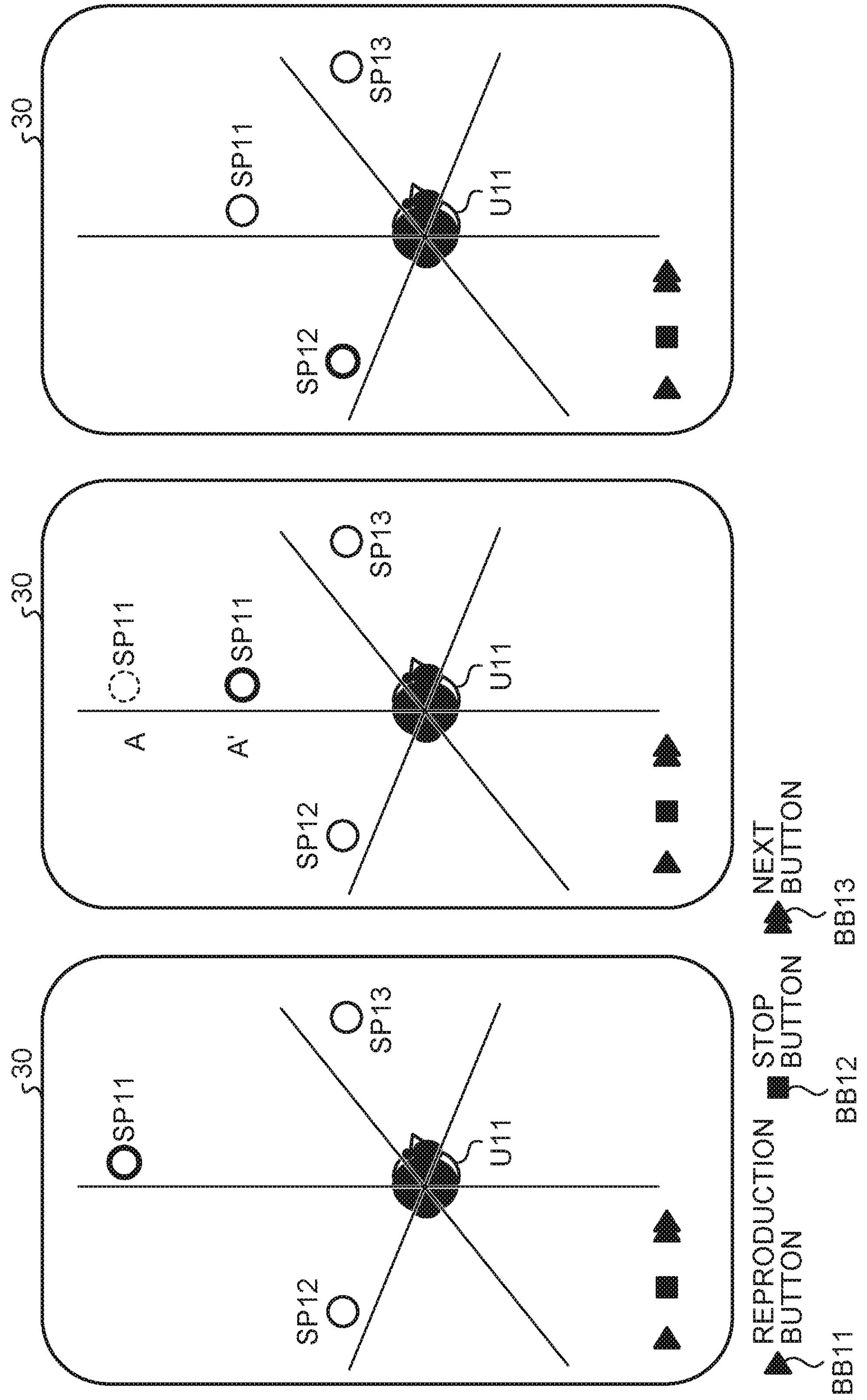
FIGS. 5A, 5B, and 5C are diagrams illustrating an example of determination processing of a perception position according to the embodiment.

FIGS. 5A, 5B, and 5C illustrate an example of processing for determining the second position information using the GUI software. FIG. 5A illustrates a display screen of the terminal device 30 at the time of activation of the GUI software or the like. In FIG. 5A, the position information of the user U11 and the first position information of the virtual speakers (speakers SP11 to SP13) whose HRTFs are determined in advance are three-dimensionally drawn and displayed. As a result, the user U11 can appropriately grasp the position of the virtual speakers by variously changing the angle. Note that, in FIGS. 5A, 5B, and 5C, similarly to FIG. 3, the speaker SP11 is a reproduction target virtual speaker. Furthermore, in FIGS. 5A, 5B, and 5C, the reproduction target virtual speaker is represented by a bold circle " " movable on the screen. Here, when the user U11 operates (for example, a click or a tap) a command BB11, the terminal device 30 transmits operation information to the information processing apparatus 10. The information processing apparatus 10 transmits, to the headphone 20, a signal obtained by convolving the HRTF at the position of the reproduction target virtual speaker with an acoustic signal such as white noise. Then, the headphone 20 reproduces on the basis of the signal received from the information processing apparatus 10.

FIG. 5B illustrates a display screen of the terminal device 30 when the user U11 operates (for example, movement by dragging or tapping) the position perceived by the reproduced sound from the position A to the position A prime. Here, the dotted circle " " indicated at the position A indicates the position before the operation of the speaker SP11. A solid circle " " indicated by the position A prime indicates the position of the speaker SP11 after operation.

FIG. 5C illustrates a display screen of the terminal device 30 when the user U11 operates a command BB12. In FIG. 5C, the reproduction target virtual speaker is switched to a different speaker by the operation of the command BB12 of the user U11. Specifically, the reproduction target virtual speaker is switched from the speaker SP11 to the speaker SP12. In this case, the bold circle " " movable on the screen is a circle indicated from the position of the speaker SP11 to the position of the speaker SP12. Then, processing similar to that of the speaker SP11 is performed. Note that, although not illustrated in FIGS. 5A, 5B, and 5C, the determination unit 1121 determines the second position information by the user U11 operating the position perceived by the user U11 with the signal convolved by the HRTF at each position for all the virtual speakers.

(2) User Adjusts Perception Position

In FIG. 3, the case where the perception position of the sound object TB11 becomes the position ☆ prime when the virtual speaker located at the position A is rendered as the reproduction target virtual speaker has been described. Furthermore, when rendering is performed using the virtual speaker located at the position A prime as the reproduction target virtual speaker, the perception position of the sound object TB11 may be the position ☆. Here, the perception position is the position ☆ because the gain of the virtual speaker located at the position A prime is larger than the gains of the virtual speakers at the positions B and C. Thus, when the virtual speaker located at the position A is moved to the position A prime, the sound object TB11 located at the position ☆ prime is moved to the position ☆. Note that, assuming that a direction from the position A to the position A prime is a downward direction, the sound object TB11 moves upward from the position ☆ prime to the position ☆. For this reason, the determination unit 1121 may determine the second position information by causing the user to adjust the position at which the sound object TB11 moves to the position ☆ using GUI software or the like. The determination unit 1121 may determine the second position information by moving the virtual speaker manually by the user (for example, manual input). Hereinafter, description will be given with reference to FIGS. 6 to 8.

Figure 6:
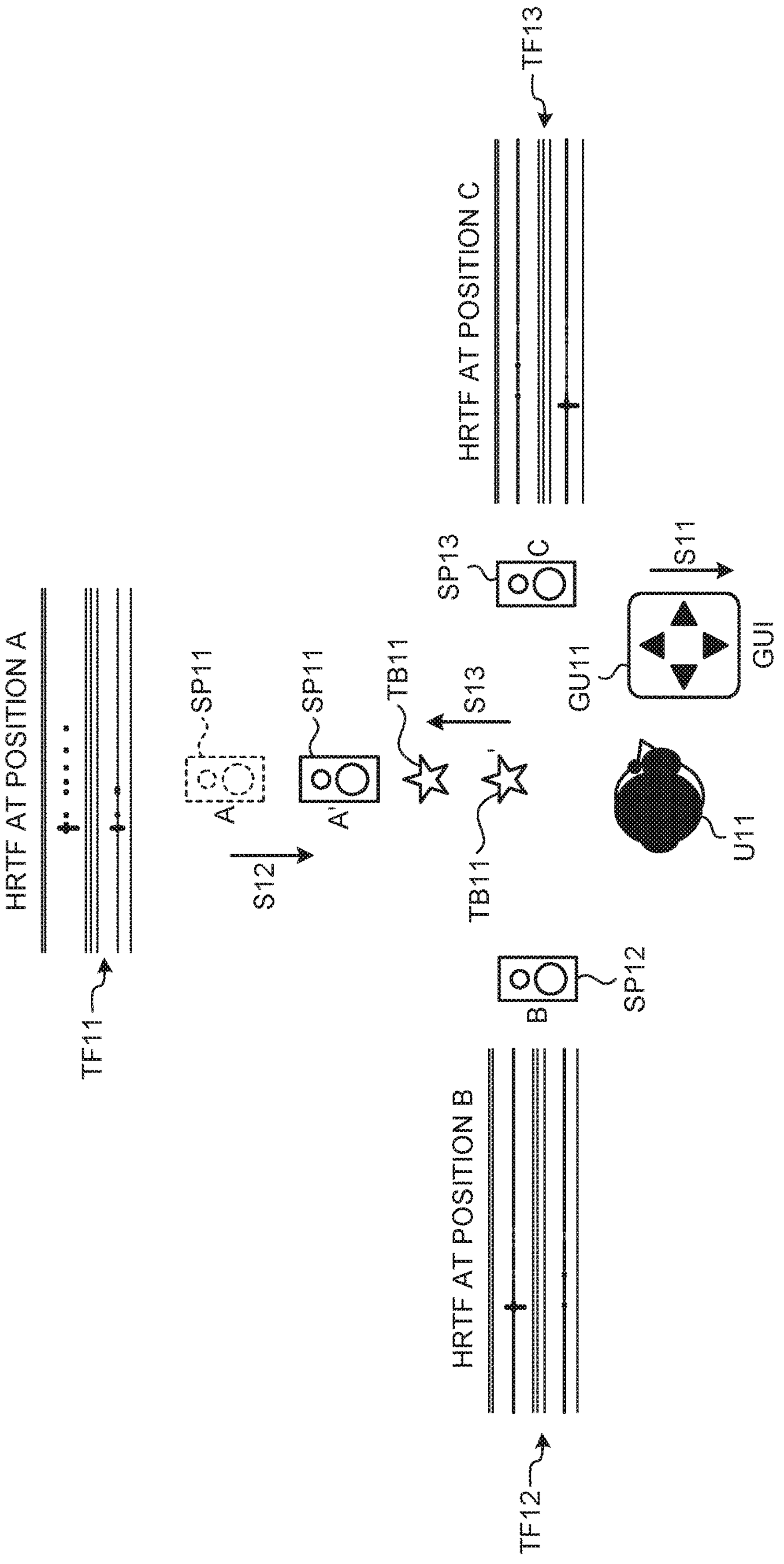
FIG. 6 is a diagram illustrating an outline of functions of an information processing apparatus according to the embodiment.

FIG. 6 is a diagram illustrating an outline of functions of the information processing apparatus 10 according to the embodiment. Note that descriptions similar to those in FIGS. 2 and 3 will be omitted as appropriate. In FIG. 6, the user U11 inputs the operation information in the downward direction using a member GU11 (for example, a screen or a device) (S11). Then, the speaker SP11 moves from the position A to the position A prime so as to match the input of the user U11 (S12). Then, the perception position of the sound object TB11 moves from the position ☆ prime to the position ☆ according to the movement of the speaker SP11 (S13). Note that the member GU11 may be, for example, a perception position adjustment button for adjusting the perception position of the sound object TB11. In this manner, the determination unit 1121 may determine the second position information on the basis of the operation of the GUI of the user to move the first position information to the second position information. In this manner, the determination unit 1121 may determine the second position information on the basis of the input information input by the user during reproduction of the output signal. Here, since the perception position of the sound object TB11 moves in a direction opposite to the speaker SP11, it may be difficult for the user U11 to adjust.

Figure 7:
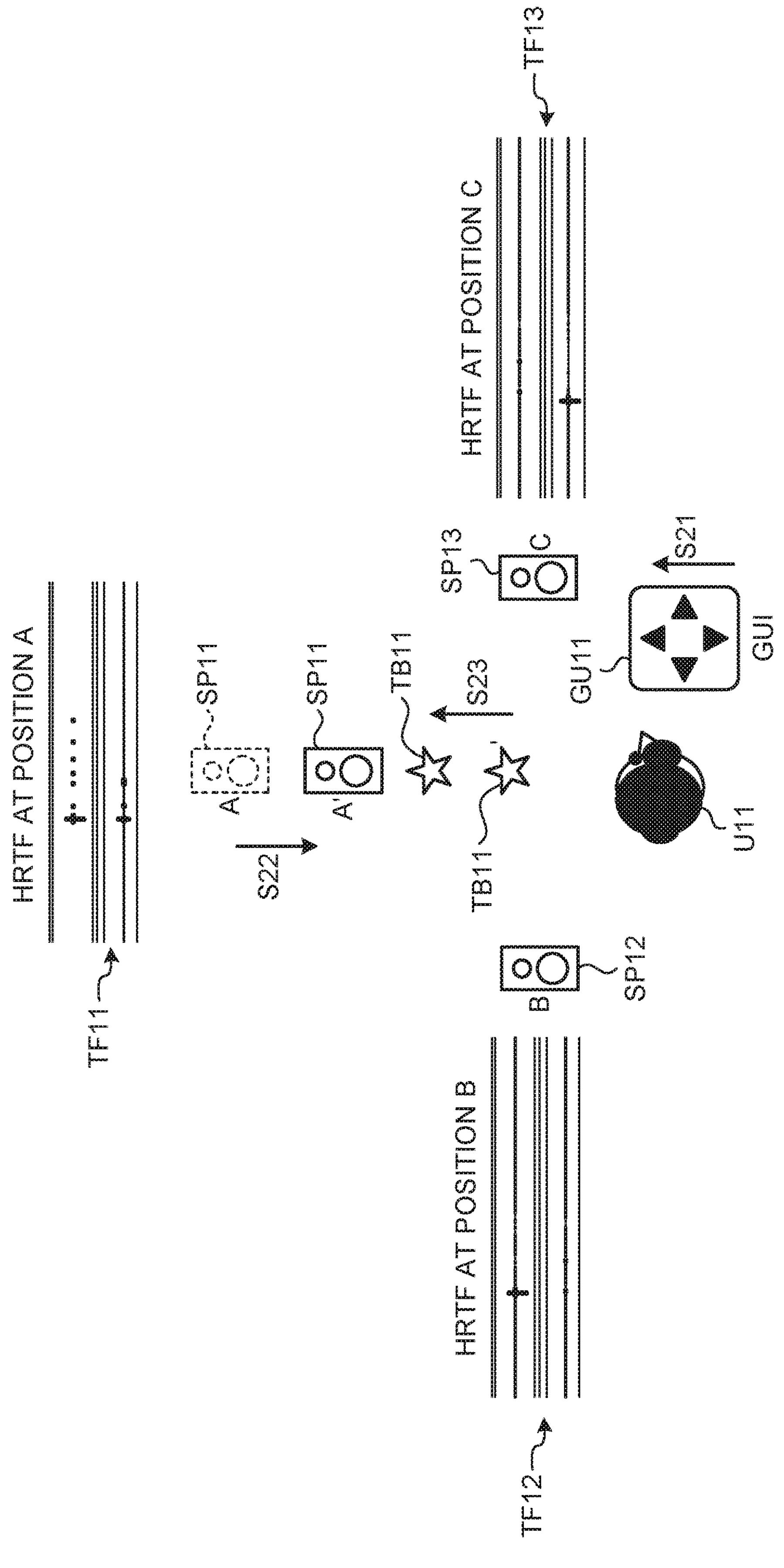
FIG. 7 is a diagram illustrating an outline of functions of the information processing apparatus according to the embodiment.

FIG. 7 is a diagram illustrating an outline of functions of the information processing apparatus 10 according to the embodiment. FIG. 7 is a modification example of FIG. 6. Note that the same description as in FIG. 6 will be omitted as appropriate. In FIG. 7, the user U11 inputs upward operation information using the member GU11 (S21). Then, the speaker SP11 moves from the position A to the position A prime in a direction opposite to the input of the user U11 (S22). Note that Step S23 is the same as Step S13. In this case, the perception position of the sound object TB11 moves from the position ☆ prime to the position ☆ so as to match the input of the user U11. As a result, in FIG. 7, since the perception position moves so as to match the input of the user U11, the user U11 can perform adjustment with a natural feeling. As a result, improvement in usability can be promoted. Hereinafter, an outline of the functions of FIGS. 6 and 7 will be described with reference to FIG. 8.

Figure 8:
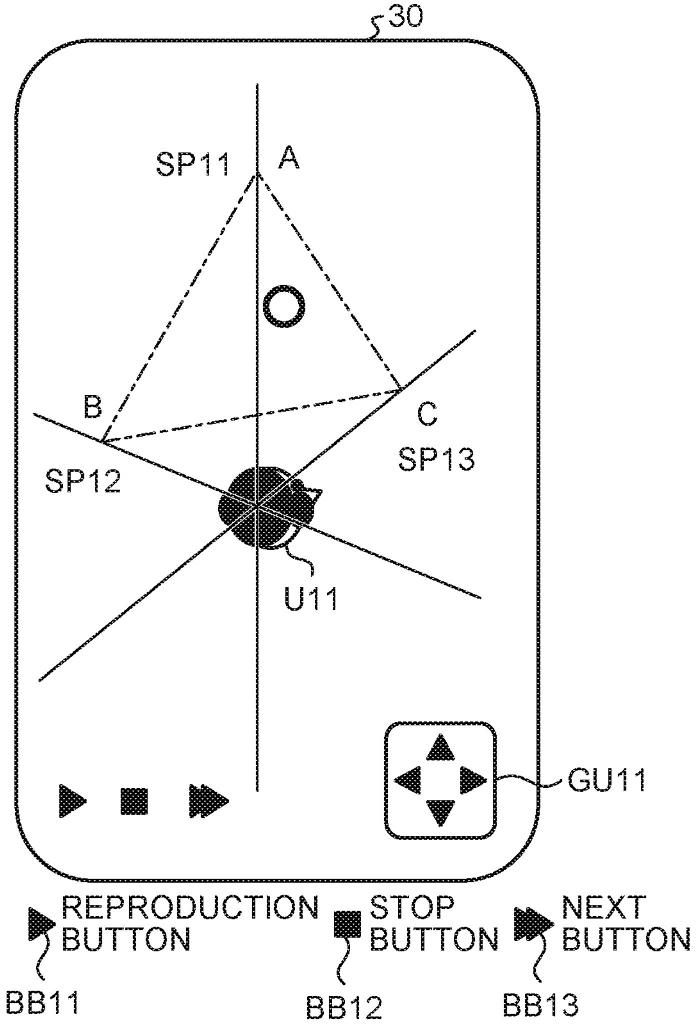
FIG. 8 is a diagram illustrating an example of a display screen of a terminal device according to the embodiment.

FIG. 8 illustrates a display screen of the terminal device 30 at the time of activation of the GUI software or the like. Note that the same description as in FIGS. 5A, 5B, and 5C will be appropriately omitted. In FIG. 8, the position information of the user U11 is displayed. Furthermore, in FIG. 8, circles " " are displayed at positions inside a triangle formed by the first position information (positions A to C) of the virtual speakers (speakers SP11 to SP13) for which the HRTFs are determined in advance. Note that, in FIG. 8, for convenience of description, a case where the reference signs of the positions A to C are displayed is illustrated, but the reference signs do not have to be actually displayed. Here, when the user U11 operates the command BB11, a signal generated based on an acoustic signal such as white noise and position information indicated by a circle " " is reproduced by the headphone 20. The user U11 uses the member GU11 to adjust a position perceived by the sound reproduced by the headphone 20 to the position indicated by the circle " ". The determination unit 1121 determines the second position information on the basis of such adjustment by the user U11. Then, when the user U11 operates the command BB13, a circle " " is displayed at the position inside the triangle configured on the basis of the first position information of the different virtual speaker not using the vertex of the triangle configured by the positions A to C as the vertex. Then, processing similar to the case where a circle " " is displayed at a position inside the triangle constituted by the positions A to C is performed.

The determination of the second position information of the virtual speaker according to the embodiment has been described by taking the two methods as examples, but the present invention is not limited to these examples. For example, the determination unit 1121 may perform the processing using a method appropriately combining the conventional techniques.

Correction Unit 1122

The correction unit 1122 has a function of rendering audio data including position information of a sound object to a plurality of virtual speakers virtually arranged in space. Furthermore, the correction unit 1122 corrects at least one piece of first position information of the plurality of virtual speakers on the basis of the second position information. Alternatively, the correction unit 1122 corrects the first position information of at least one of the plurality of virtual speakers on the basis of a difference between the first position information and the second position information. For example, the correction unit 1122 corrects the first position information on the basis of the second position information determined by the determination unit 1121. Furthermore, for example, the correction unit 1122 corrects the first position information so that the perception position of the sound object perceived by the user becomes a position determined in advance on the basis of the position information of the sound object.

Note that the calculation of the difference between the first position information and the second position information is performed by the correction unit 1122, for example. For example, the correction unit 1122 calculates the difference on the basis of the comparison of the coordinate information indicating the position information. Furthermore, for example, the correction unit 1122 corrects the first position information on the basis of distance information indicating the difference.

The correction unit 1122 may correct the first position information such that the larger the difference between the first position information and the second position information, the larger the correction amount of the perception position of the sound object. For example, the correction unit 1122 may correct the first position information on the basis of a correction amount of the perception position of the sound object determined in advance according to a difference between the first position information and the second position information.

The correction unit 1122 may correct the first position information of the reproduction target virtual speaker on the basis of the perception position of the sound object included in a predetermined range configured on the basis of the first position information of the plurality of virtual speakers. For example, the correction unit 1122 may correct the first position information of the reproduction target virtual speaker on the basis of the perception position of the sound object included in the range of a triangle formed on the basis of the first position information of the three virtual speakers.

Generation Unit 1123

The generation unit 1123 has a function of generating sound for reproduction. For example, the generation unit 1123 generates a sound for reproduction by adding all the sounds of the plurality of virtual speakers.

The generation unit 1123 generates an output signal for each audio output unit on the basis of the HRTF of the user from the speaker signal for each virtual speaker generated by the correction unit 1122. For example, the generation unit 1123 may generate the output signal for each audio output unit on the basis of the HRTF estimated from the imaging information such as an ear image of the user. Furthermore, for example, the generation unit 1123 may generate the output signal for each audio output unit on the basis of an average HRTF calculated from the HRTFs of the plurality of users.

The generation unit 1123 generates a speaker signal by performing rendering with VBAP with the second position information as the first position information for each of the virtual speakers. Furthermore, the generation unit 1123 applies the HRTF held in advance to the speaker signal for each of the virtual speakers to generate an output signal for each virtual speaker. Then, for each of the virtual speakers, the generation unit 1123 adds the output signal for each virtual speaker for each of the L and R signals to generate an output signal.

Output Unit 113

The output unit 113 has a function of outputting a correction result by the correction unit 1122. The output unit 113 provides the information regarding the correction result to, for example, the terminal device 30 via the communication unit 100. Upon receiving the output information provided from the output unit 113, the terminal device 30 displays the output information via an output unit 320. The output unit 113 may provide control information for displaying the output information. Furthermore, the output unit 113 may generate output information for displaying information regarding the correction result on the terminal device 30.

The output unit 113 has a function of outputting a generation result by the generation unit 1123. The output unit 113 provides the information regarding the generation result to, for example, the headphone 20 via the communication unit 100. For example, the output unit 113 provides an output signal for each audio output unit. Specifically, an output signal obtained by adding the speaker signal for each virtual speaker for each of the L and R signals is provided. Upon receiving the output information provided from the output unit 113, the headphone 20 outputs the output information via an output unit 220. The output unit 113 may provide control information for outputting the output information. Furthermore, the output unit 113 may generate output information for outputting information regarding the generation result to the headphone 20.

(1-3) Storage Unit 120

The storage unit 120 is realized by, for example, a semiconductor memory element such as a random access memory (RAM) or a flash memory, or a storage device such as a hard disk or an optical disk. The storage unit 120 has a function of storing a computer program and data (including a form of a program) related to processing in the information processing apparatus 10.

Figures 9, 10:
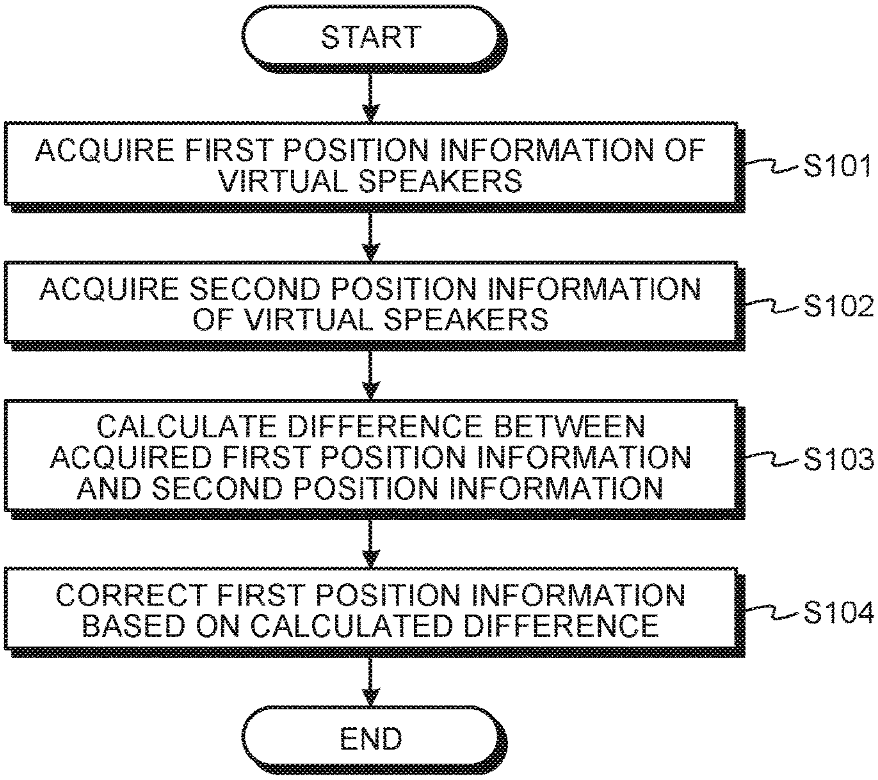
FIG. 9 is a diagram illustrating an example of a storage unit according to the embodiment.
FIG. 10 is a flowchart illustrating a flow of processing of the information processing apparatus according to the embodiment.

FIG. 9 illustrates an example of the storage unit 120. The storage unit 120 illustrated in FIG. 9 stores the first position information of the virtual speakers. As illustrated in FIG. 9, the storage unit 120 may include items such as "virtual speaker ID", "user ID", "virtual speaker position", and "HRTF".

The "virtual speaker ID" indicates identification information for identifying the virtual speakers. The "user ID"

indicates identification information for identifying the user. The "virtual speaker position" indicates the first position information of the virtual speakers. In the example illustrated in FIG. 9, a case where conceptual information such as "virtual speaker position #11" and "virtual speaker position #12" is stored in the "virtual speaker position" is illustrated, but actually, coordinate information, information indicating a relative position with respect to another virtual speaker, or the like may be stored. "HRTF" indicates an HRTF determined in advance on the basis of the first position information of the virtual speakers. In the example illustrated in FIG. 9, a case where conceptual information such as "HRTF #11" and "HRTF #12" is stored in "HRTF" is illustrated, but actually, HRTF data measured by a microphone or the like at the ear of the user is stored.

(2) Headphone 20

As illustrated in FIG. 4, the headphone 20 includes a communication unit 200, a control unit 210, and the output unit 220.

(2-1) Communication Unit 200

The communication unit 200 has a function of communicating with an external device. For example, in communication with the external device, the communication unit 200 outputs information received from the external device to the control unit 210. Specifically, the communication unit 200 outputs information received from the information processing apparatus 10 to the control unit 210. For example, the communication unit 200 outputs information regarding acquisition of information regarding the sound for reproduction to the control unit 210. For example, the communication unit 200 outputs information regarding acquisition of the output signal for each audio output unit to the control unit 210.

(2-2) Control Unit 210

The control unit 210 has a function of controlling an operation of the headphone 20. For example, the control unit 210 performs processing for reproducing audio on the basis of information transmitted from the information processing apparatus 10 via the communication unit 200. For example, the control unit 210 performs processing for outputting an output signal.

(2-3) Output Unit 220

The output unit 220 is realized by a member capable of outputting sound such as a speaker. The output unit 220 outputs audio. For example, the output unit 220 outputs an output signal.

(3) Terminal Device 30

As illustrated in FIG. 4, the terminal device 30 includes a communication unit 300, a control unit 310, and the output unit 320.

(3-1) Communication Unit 300

The communication unit 300 has a function of communicating with an external device. For example, in communication with the external device, the communication unit 300 outputs information received from the external device to the control unit 310. Specifically, the communication unit 300 outputs information regarding the correction result received from the information processing apparatus 10 to the control unit 310.

(3-2) Control Unit 310

The control unit 310 has a function of controlling an overall operation of the terminal device 30. For example, the control unit 310 performs processing of controlling output of information regarding the correction result. Furthermore, for example, the control unit 310 performs processing for moving the reproduction target virtual speaker according to an operation by the user. Furthermore, for example, the control unit 310 performs processing for moving the perception position of the sound object perceived by the user according to the movement of the reproduction target virtual speaker.

(3-3) Output Unit 320

The output unit 320 has a function of outputting information regarding the correction result. The output unit 320 outputs the output information provided from the output unit 113 via the communication unit 300. For example, the output unit 320 displays the output information on the display screen of the terminal device 30. Furthermore, the output unit 320 may output the output information on the basis of the control information provided from the output unit 113.

The output unit 320 displays output information according to an operation by the user. For example, the output unit 320 displays information regarding position information of the reproduction target virtual speaker or the sound object.

2.3. Processing of Information Processing System

The functions of the information processing system 1 according to the embodiment have been described above. Next, processing of the information processing system 1 will be described.

FIG. 10 is a flowchart illustrating a flow of processing in the information processing apparatus 10 according to the embodiment. The information processing apparatus 10 acquires the first position information of the virtual speakers (S101). Furthermore, the information processing apparatus 10 acquires the second position information of the virtual speakers (S102). Next, the information processing apparatus 10 calculates a difference between the first position information and the second position information (S103). For example, the information processing apparatus 10 calculates the difference on the basis of the comparison of coordinate information. Then, the information processing apparatus 10 corrects the first position information on the basis of the calculated difference (S104). For example, on the basis of the calculated difference, the information processing apparatus 10 corrects the first position information so that the perception position of the sound object perceived by the user becomes a position determined in advance on the basis of the position information of the sound object.

Figure 11:
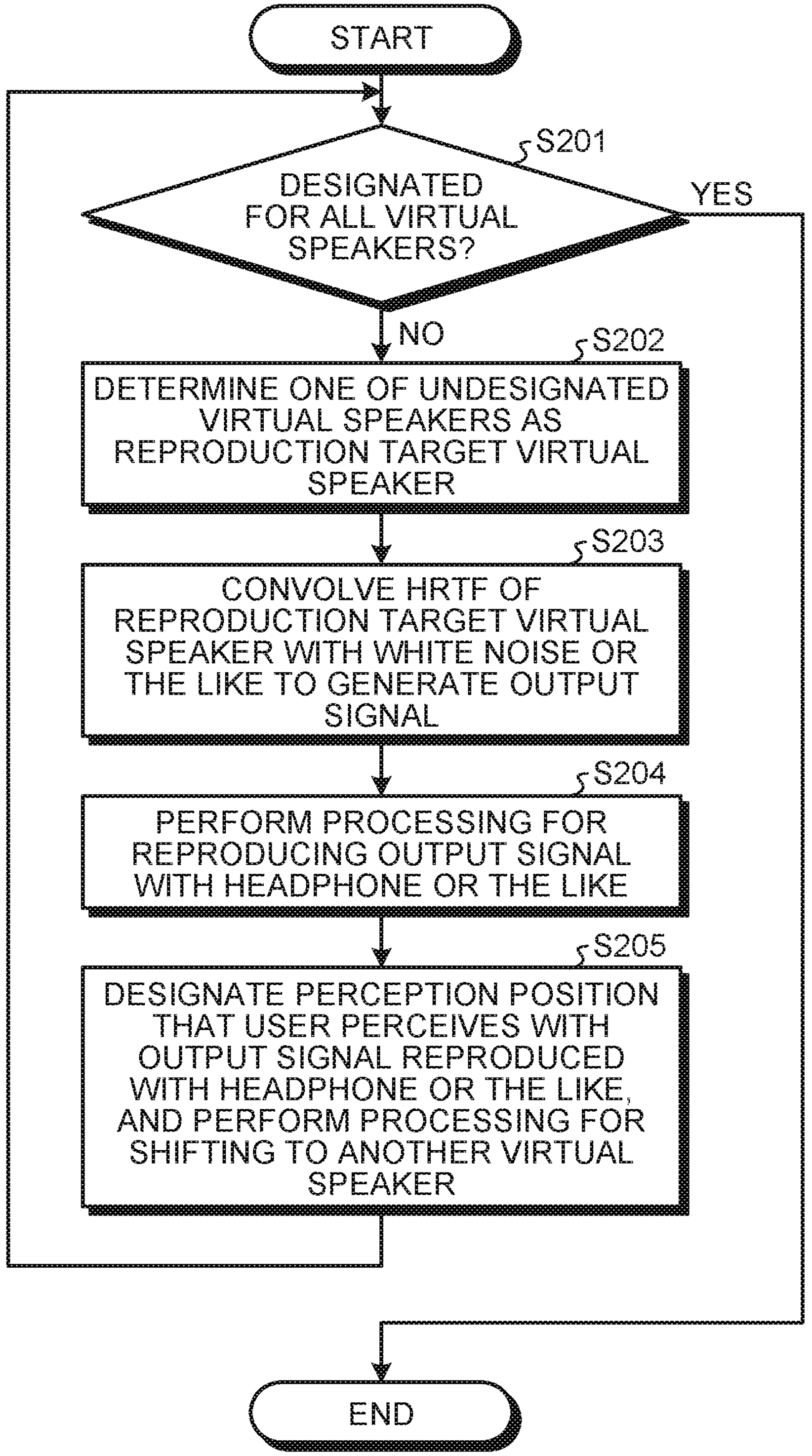
FIG. 11 is a flowchart illustrating a flow of processing of the information processing apparatus according to the embodiment.

FIG. 11 is a flowchart illustrating a flow of processing in the information processing apparatus 10 according to the embodiment. The information processing apparatus 10 determines whether or not designation from the user has been accepted for all the target virtual speakers (S201). In a case where the information processing apparatus 10 determines that the designation from the user has been accepted for all the virtual speakers (S201; Yes), the information processing is terminated. On the other hand, in a case where the information processing apparatus 10 determines that the designation from the user has not been accepted for all the virtual speakers (S201; No), one of the undesignated virtual speakers is determined as the reproduction target virtual speaker (S202). Next, the information processing apparatus 10 convolves the HRTF of the reproduction target virtual speaker with white noise or the like to generate an output signal (S203). Furthermore, the information processing apparatus 10 performs processing for reproducing the output signal with a headphone or the like (S204). Next, the information processing apparatus 10 designates a perception position that the user perceives with an output signal reproduced with headphones or the like, and performs processing for shifting to another virtual speaker (S205). Specifically, in a case where the user designates the perception position and the information processing apparatus 10 receives an operation of the "next" button or the like, the information processing apparatus 10 performs processing for shifting to another virtual speaker. Then, the process returns to Step S201.

2.4. Processing Variations

The embodiment of the present disclosure has been described above. Next, variations of the processing of the embodiment of the present disclosure will be described. Note that the variations of the processing described below may be applied to the embodiment of the present disclosure alone, or may be applied to the embodiment of the present disclosure in combination. Furthermore, the variations of the processing may be applied instead of the configuration described in the embodiment of the present disclosure, or may be additionally applied to the configuration described in the embodiment of the present disclosure.

Figure 12:
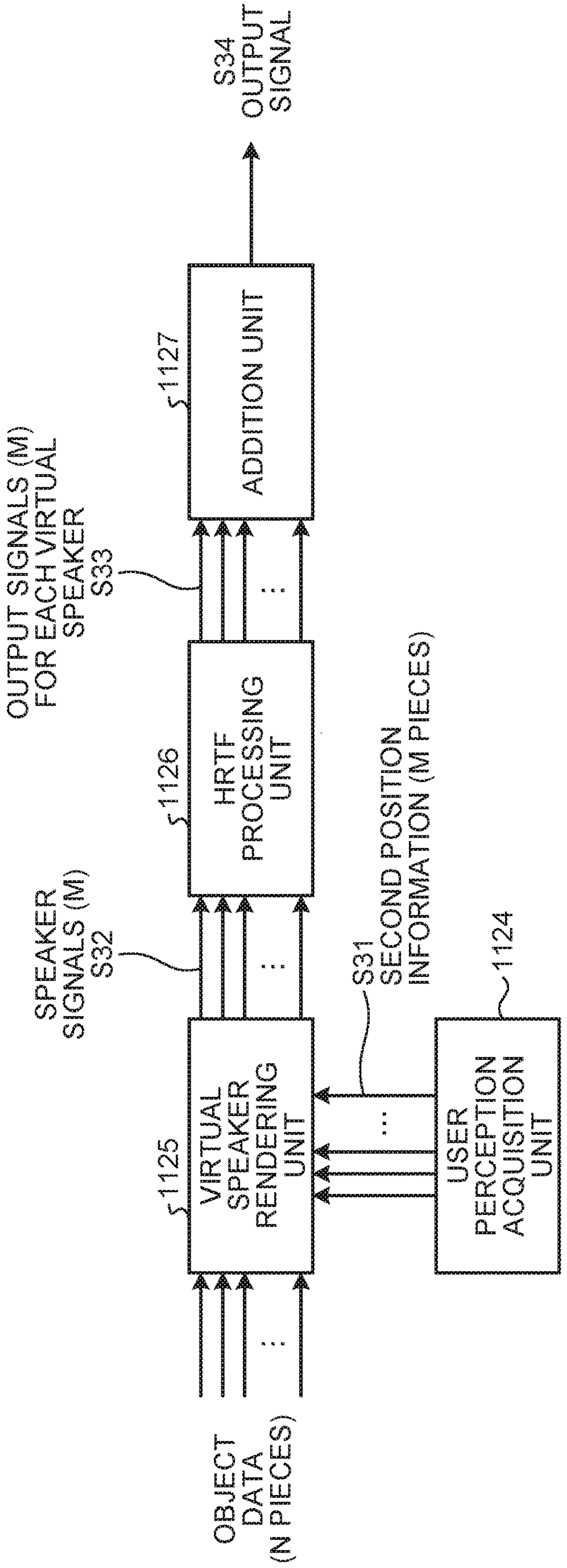
FIG. 12 is a diagram illustrating an outline of functions of an information processing system according to a modification example of the embodiment.

In the above embodiment, an outline of functions of the information processing apparatus 10 in a case where the number of input sound objects is N and the number of virtual speakers is M will be described. Note that N may be any number as long as N is an integer of one or more and M may be any number as long as M is an integer of two or more. FIG. 12 is a diagram illustrating an outline of functions of the information processing apparatus 10 according to a modification example of the embodiment. In the above embodiment, as illustrated in FIG. 4, the processing unit 112 includes the determination unit 1121, the correction unit 1122, and the generation unit 1123. Here, as illustrated in FIG. 12, the processing unit 112 may include a user perception acquisition unit 1124, a virtual speaker rendering unit 1125, an HRTF processing unit 1126, and an addition unit 1127 in addition to the configuration illustrated in FIG. 4. The determination unit 1121, the correction unit 1122, the generation unit 1123, the user perception acquisition unit 1124, the virtual speaker rendering unit 1125, the HRTF processing unit 1126, and the addition unit 1127 included in the processing unit 112 may be each configured as an independent computer program module, or a plurality of functions may be configured as one integrated computer program module.

The user perception acquisition unit 1124 acquires, for each of the M virtual speakers, information (second position information) regarding the perceived position where a signal to which the held HRTF is applied was perceived by the user. Then, the user perception acquisition unit 1124 provides the acquired second position information to the virtual speaker rendering unit 1125 (S31).

For each of the N sound objects, the virtual speaker rendering unit 1125 performs rendering processing with VBAP using the second position information acquired by the user perception acquisition unit 1124 as the first position information, and generates N×M signals (Hereinafter, referred to as "virtual speaker rendering signals" appropriately). Furthermore, the virtual speaker rendering unit 1125 adds N virtual speaker rendering signals for each sound object for each of the virtual speakers. Then, the virtual speaker rendering unit 1125 provides the resultant M speaker signals to the HRTF processing unit 1126 (S32).

The HRTF processing unit 1126 applies the previously held HRTF to each of the speaker signals provided from the virtual speaker rendering unit 1125 for each of the virtual speakers. Then, the HRTF processing unit 1126 provides the resultant output signal (for example, headphone signal) for each of the M virtual speakers to the addition unit 1127 (S33).

The addition unit 1127 adds the output signal for each virtual speaker provided from the HRTF processing unit 1126 for each of the L and R signals for each virtual speaker. Then, the addition unit 1127 performs processing for outputting an output signal (S34).

3. Hardware Configuration Example

Figure 13:
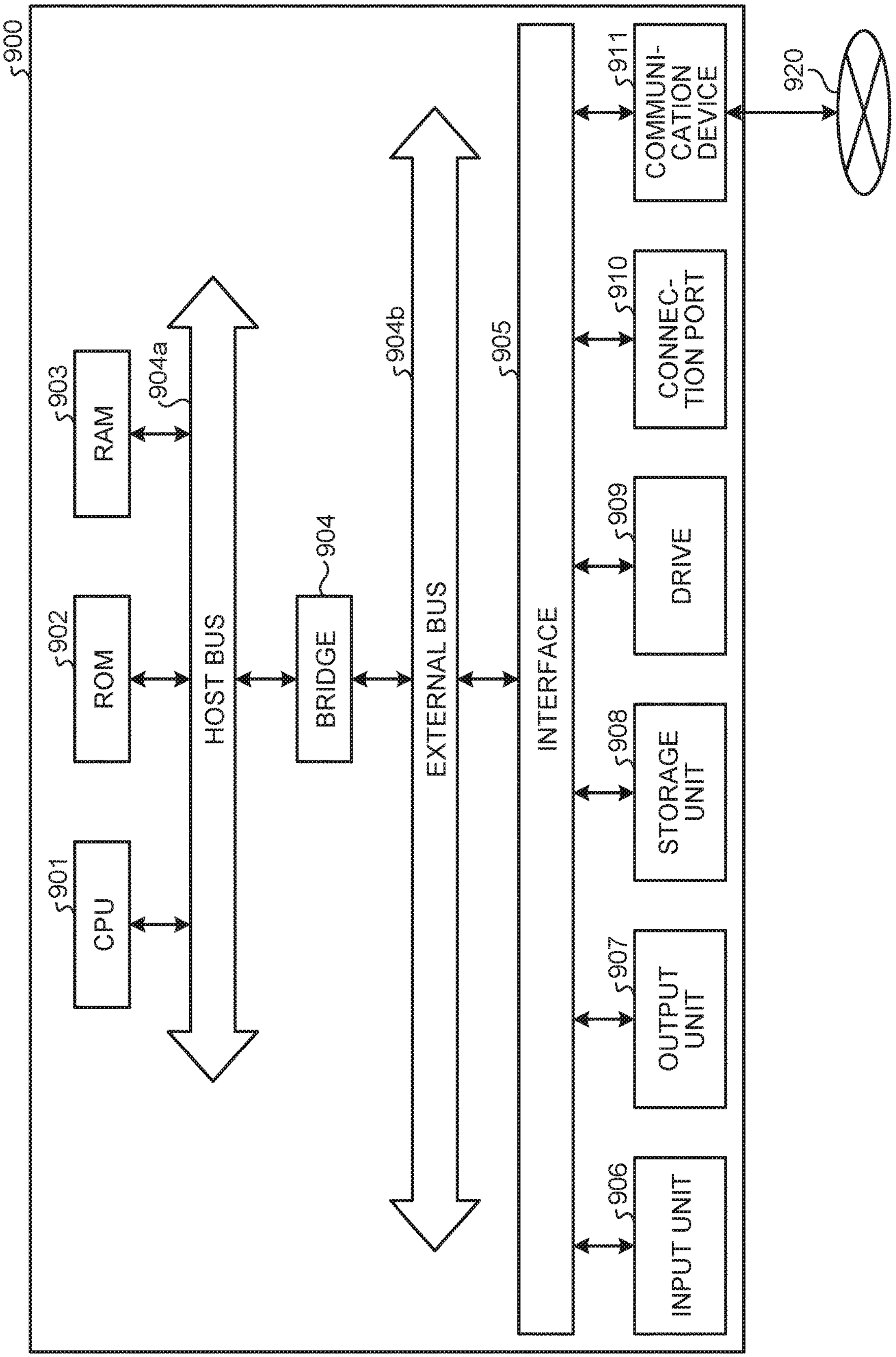
FIG. 13 is a hardware configuration diagram illustrating an example of a computer that implements functions of the information processing apparatus.

Finally, a hardware configuration example of the information processing apparatus according to the embodiment will be described with reference to FIG. 13. FIG. 13 is a block diagram illustrating a hardware configuration example of the information processing apparatus according to the embodiment. Note that an information processing apparatus 900 illustrated in FIG. 13 can realize, for example, the information processing apparatus 10, the headphone 20, and the terminal device 30 illustrated in FIG. 4. Information processing by the information processing apparatus 10, the headphone 20, and the terminal device 30 according to the embodiment is realized by cooperation of software (configured by a computer program) and hardware described below.

As illustrated in FIG. 13, the information processing apparatus 900 includes a central processing unit (CPU) 901, a read only memory (ROM) 902, and a random access memory (RAM) 903. Furthermore, the information processing apparatus 900 includes a host bus 904*a*, a bridge 904, an external bus 904*b*, an interface 905, an input device 906, an output device 907, a storage device 908, a drive 909, a connection port 910, and a communication device 911. Note that the hardware configuration illustrated here is an example, and some of the components may be omitted. Furthermore, the hardware configuration may further include components other than the components illustrated here.

The CPU 901 functions as, for example, an arithmetic processing device or a control device, and controls the overall operation of each component or a part thereof on the basis of various computer programs recorded in the ROM 902, the RAM 903, or the storage device 908. The ROM 902 is a unit that stores a program read by the CPU 901, data used for calculation, and the like. The RAM 903 temporarily or permanently stores, for example, a program read by the CPU 901 and data (part of the program) such as various parameters that appropriately change when the program is executed. These are mutually connected by the host bus 904*a* including a CPU bus or the like. The CPU 901, the ROM 902, and the RAM 903 can implement the functions of the control unit 110, the control unit 210, and the control unit 310 described with reference to FIG. 4, for example, in cooperation with software.

The CPU 901, the ROM 902, and the RAM 903 are mutually connected via, for example, the host bus 904*a* capable of high-speed data transmission. On the other hand, the host bus 904*a* is connected to the external bus 904*b* having a relatively low data transmission speed via the bridge 904, for example. Furthermore, the external bus 904*b* is connected to various components via the interface 905.

The input device 906 is realized by, for example, a device to which information is input by a listener, such as a mouse, a keyboard, a touch panel, a button, a microphone, a switch, and a lever. Furthermore, the input device 906 may be, for example, a remote control device using infrared rays or other radio waves, or may be an external connection device such as a mobile phone or a PDA corresponding to the operation of the information processing apparatus 900. Moreover, the input device 906 may include, for example, an input control circuit that generates an input signal on the basis of information input using the above input means and outputs the input signal to the CPU 901. By operating the input device 906, an administrator of the information processing apparatus 900 can input various data to the information processing apparatus and instruct the information processing apparatus 900 on processing operations.

In addition, the input device 906 can be formed by a device that detects a position of the user. For example, the input device 906 may include various sensors such as an image sensor (for example, a camera), a depth sensor (for example, a stereo camera), an acceleration sensor, a gyro sensor, a geomagnetic sensor, an optical sensor, a sound sensor, a distance measurement sensor (for example, a time of flight (ToF) sensor), and a force sensor. Furthermore, the input device 906 may acquire information regarding a state of the information processing apparatus 900 itself, such as an attitude and moving speed of the information processing apparatus 900, and information regarding the surrounding space of the information processing apparatus 900, such as brightness and noise around the information processing apparatus 900. Furthermore, the input device 906 may include a global navigation satellite system (GNSS) module that receives a GNSS signal (for example, a global positioning system (GPS) signal from a GPS satellite) from a GNSS satellite and measures position information including the latitude, longitude, and altitude of the device. Furthermore, regarding the position information, the input device 906 may detect the position by transmission and reception with Wi-Fi (registered trademark), a mobile phone, a PHS, a smartphone, or the like, near field communication, or the like. The input device 906 can implement, for example, the function of the acquisition unit 111 described with reference to FIG. 4.

The output device 907 is formed of a device capable of visually or aurally notifying the user of the acquired information. Examples of such a device include a display device such as a CRT display device, a liquid crystal display device, a plasma display device, an EL display device, a laser projector, an LED projector, and a lamp, a sound output device such as a speaker and a headphone, and a printer device. The output device 907 outputs, for example, results obtained by various types of processing performed by the information processing apparatus 900. Specifically, the display device visually displays results obtained by various processing performed by the information processing apparatus 900 in various formats such as text, images, tables, and graphs. On the other hand, the audio output device converts an audio signal including reproduced audio data, acoustic data, or the like into an analog signal and aurally outputs the analog signal. The output device 907 can implement, for example, the functions of the output unit 113, the output unit 220, and the output unit 320 described with reference to FIG. 4.

The storage device 908 is a device for data storage formed as an example of a storage unit of the information processing apparatus 900. The storage device 908 is realized by, for example, a magnetic storage device such as an HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. The storage device 908 stores computer programs executed by the CPU 901, various data, various data acquired from the outside, and the like. The storage device 908 can realize, for example, the function of the storage unit 120 described with reference to FIG. 4.

The drive 909 is a reader/writer for a storage medium, and is built in or externally attached to the information processing apparatus 900. The drive 909 reads information recorded in a removable storage medium such as a mounted magnetic disk, optical disk, magneto-optical disk, or semiconductor memory, and outputs the information to the RAM 903. Furthermore, the drive 909 can also write information to a removable storage medium.

The connection port 910 is, for example, a port for connecting an external connection device such as a universal serial bus (USB) port, an IEEE 1394 port, a small computer system interface (SCSI), an RS-232C port, or an optical audio terminal.

The communication device 911 is, for example, a communication interface formed by a communication device or the like for connecting to the network 920. The communication device 911 is, for example, a communication card for wired or wireless local area network (LAN), long term evolution (LTE), Bluetooth (registered trademark), wireless USB (WUSB), or the like. Furthermore, the communication device 911 may be a router for optical communication, a router for asymmetric digital subscriber line (ADSL), a modem for various communications, or the like. For example, the communication device 911 can transmit and receive signals and the like to and from the Internet and other communication devices according to a predetermined protocol such as TCP/IP. The communication device 911 can implement, for example, the functions of the communication unit 100, the communication unit 200, and the communication unit 300 described with reference to FIG. 4.

Note that the network 920 is a wired or wireless transmission path of information transmitted from a device connected to the network 920. For example, the network 920 may include a public network such as the Internet, a telephone network, or a satellite communication network, various local area networks (LANs) including Ethernet (registered trademark), a wide area network (WAN), or the like. Furthermore, the network 920 may include a dedicated line network such as an Internet protocol-virtual private network (IP-VPN).

An example of the hardware configuration capable of realizing the functions of the information processing apparatus 900 according to the embodiment has been described above. Each of the above-described components may be realized using a general-purpose member, or may be realized by hardware specialized for the function of each component. Therefore, it is possible to appropriately change the hardware configuration to be used according to the technical level at the time of carrying out the embodiment.

4. Summary

As described above, the information processing apparatus 10 according to the embodiment performs processing for correcting the first position information on the basis of the second position information. Furthermore, the information processing apparatus 10 corrects the first position information so that the perception position of the sound object perceived by the user becomes a position determined in advance on the basis of the position information of the sound object. As a result, since the information processing apparatus 10 can localize the sound image of the sound object at an intended position, it is possible to promote improvement in sound quality when reproducing the sound image.

Therefore, it is possible to provide a new and improved information processing apparatus, information processing method, and terminal device capable of promoting further improvement in usability.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

For example, each device described in the present specification may be realized as a single device, or some or all of the devices may be realized as separate devices. For example, the information processing apparatus 10, the headphone 20, and the terminal device 30 illustrated in FIG. 4 may be realized as independent devices. Furthermore, for example, it may be realized as a server device connected to the information processing apparatus 10, the headphone 20, and the terminal device 30 via a network or the like. Furthermore, the function of the control unit 110 included in the information processing apparatus 10 may be included in a server device connected via a network or the like.

Furthermore, the series of processing by each device described in the present specification may be realized using any of software, hardware, and a combination of software and hardware. The computer program constituting the software is stored in advance in, for example, a recording medium (non-transitory medium) provided inside or outside each device. Then, each program is read into the RAM at the time of execution by the computer, for example, and is executed by a processor such as a CPU.

Furthermore, the processing described using the flowchart in the present specification may not necessarily be executed in the illustrated order. Some processing steps may be performed in parallel. Furthermore, additional processing steps may be employed, and some processing steps may be omitted.

Further, the advantageous effects described in the present specification are merely illustrative or exemplary, and are not restrictive. That is, the technique according to the present disclosure can exhibit other advantageous effects obvious to those skilled in the art from the description of the present specification together with or instead of the above advantageous effects.

Note that the following configurations also belong to the technical scope of the present disclosure.

(1)

An information processing apparatus including:

a correction unit that renders audio data including position information of a sound object to a plurality of virtual speakers virtually arranged in a space; and an acquisition unit that acquires first position information regarding virtual positions of the virtual speakers in the space and second position information regarding positions of the virtual speakers in the space perceived by a user, wherein the correction unit corrects the first position information of at least one of the plurality of virtual speakers based on the second position information.

(2)

The information processing apparatus according to (1), further including a generation unit that generates an output signal for each of audio output units based on a head-related transfer function of the user from a speaker signal for each of the virtual speakers generated by the correction unit, wherein the acquisition unit acquires the second position information of the virtual speakers based on input information input by the user during reproduction of the output signal from the audio output units.

(3)

The information processing apparatus according to (2), wherein the generation unit generates the output signal for each of the audio output units based on a head-related transfer function estimated from an ear image of the user.

(4)

The information processing apparatus according to (2), wherein the generation unit generates the output signal for each of the audio output units based on an average head-related transfer function calculated from head-related transfer functions of a plurality of the users.

(5)

The information processing apparatus according to any one of (1) to (4), wherein the correction unit corrects the first position information so that a perception position of the sound object perceived by the user becomes a predetermined position based on position information of the sound object.

(6)

The information processing apparatus according to any one of (1) to (5), further including a determination unit that determines the second position information, wherein the correction unit corrects the first position information based on the second position information determined by the determination unit.

(7)

The information processing apparatus according to (6), wherein the determination unit determines the second position information based on line-of-sight information based on imaging information obtained by imaging the user while directing a terminal device in a direction of the sound object perceived by the user.

(8)

The information processing apparatus according to (6), wherein the determination unit determines the second position information based on geomagnetic information detected by a terminal device while the terminal device having a rod-like shape is directed in a direction of the sound object perceived by the user.

(9)

The information processing apparatus according to (6), wherein the determination unit determines the second position information based on an operation of moving the first position information to the second position information, the operation being an operation of a graphical user interface (GUI) of the user.

(10)

The information processing apparatus according to (9), the determination unit determines the second position information based on movement of the virtual speakers in a direction opposite to the operation.

(11)

The information processing apparatus according to any one of (1) to (10), wherein the sound object is included in a predetermined range configured based on a plurality of pieces of the first position information.

(12)

An information processing method executed by a computer, the method including:

a correction step of rendering audio data including position information of a sound object to a plurality of virtual speakers virtually arranged in a space; and an acquisition step of acquiring first position information regarding virtual positions of the virtual speakers in the space and second position information regarding positions of the virtual speakers in the space perceived by a user, wherein the correction step corrects the first position information of at least one of the plurality of virtual speakers based on the second position information.

(13)

A terminal device including an output unit that outputs output information according to an operation of moving first position information provided from an information processing apparatus and relating to a virtual position of a virtual speaker in a space to second position information relating to a position of the virtual speaker in the space perceived by a user, wherein the information processing apparatus corrects the first position information of at least one of a plurality of the virtual speakers that have rendered audio data including position information of a sound object based on the second position information.

REFERENCE SIGNS LIST

1 INFORMATION PROCESSING SYSTEM
10 INFORMATION PROCESSING APPARATUS
20 HEADPHONE
30 TERMINAL DEVICE
100 COMMUNICATION UNIT
110 CONTROL UNIT
111 ACQUISITION UNIT
112 PROCESSING UNIT
1121 DETERMINATION UNIT
1122 CORRECTION UNIT
1123 GENERATION UNIT
1124 USER PERCEPTION ACQUISITION UNIT
1125 VIRTUAL SPEAKER RENDERING UNIT
1126 HRTF PROCESSING UNIT
1127 ADDITION UNIT
113 OUTPUT UNIT
200 COMMUNICATION UNIT
210 CONTROL UNIT
220 OUTPUT UNIT
300 COMMUNICATION UNIT
310 CONTROL UNIT
320 OUTPUT UNIT

The invention claimed is:

1. An information processing apparatus, including:

a memory configured to store instructions; and a Central Processing Unit (CPU) communicably coupled to the memory, wherein the CPU is configured to execute the instructions stored in the memory to:

render audio data to a plurality of virtual speakers virtually in a space, wherein the audio data includes position information of a sound object;

acquire first position information regarding virtual positions of the plurality of virtual speakers in the space and second position information regarding positions of the plurality of virtual speakers in the space perceived by a user; and correct the first position information of at least one virtual speaker of the plurality of virtual speakers based on the second position information.

2. The information processing apparatus according to claim 1, wherein the CPU is further configured to:

generate an output signal for each of a plurality of audio output units from a speaker signal for each of the plurality of virtual speakers, wherein the output signal for the each of the plurality of audio output units is generated based on a head-related transfer function of the user; and acquire the second position information of the plurality of virtual speakers based on input information input by the user, wherein the input information is input at a time of reproduction of the output signal from the plurality of audio output units.

3. The information processing apparatus according to claim 2, wherein the CPU is further configured to generate the output signal for each of the plurality of audio output units based on the head-related transfer function estimated from an ear image of the user.

4. The information processing apparatus according to claim 2, wherein the CPU is further configured to generate the output signal for each of the plurality of audio output units based on an average head-related transfer function calculated from a plurality of head-related transfer functions of a plurality of users, wherein the plurality of users includes the user.

5. The information processing apparatus according to claim 1, wherein the CPU is further configured to correct the first position information to make a perception position of the sound object perceived by the user a specific position based on the position information of the sound object.

6. The information processing apparatus according to claim 1, wherein the CPU is further configured to:

determine the second position information; and correct the first position information based on the determined second position information.

7. The information processing apparatus according to claim 6, wherein the CPU is further configured to determine the second position information based on line-of-sight information, wherein the line-of-sight information is based on imaging information obtained based on an image of the user, and at a time the image of the user is captured, a terminal device is directed in a direction of the sound object perceived by the user.

8. The information processing apparatus according to claim 6, wherein the CPU is further configured to determine the second position information based on geomagnetic information detected by a terminal device, wherein the terminal device has a rod-like shape, and the terminal device is directed in a direction of the sound object perceived by the user.

9. The information processing apparatus according to claim 6, wherein the CPU is further configured to determine the second position information based on an operation to move the first position information to the second position information, wherein the operation corresponds to a graphical user interface (GUI) of the user.

10. The information processing apparatus according to claim 9, wherein the CPU is further configured to determine the second position information based on movement of the plurality of virtual speakers in a direction opposite to a direction of the operation.

11. The information processing apparatus according to claim 1, wherein the sound object is included in a specific range, and the specific range is configured based on a plurality of pieces of the first position information.

12. An information processing method executed by a computer, the method including:

rendering audio data to a plurality of virtual speakers virtually in a space, wherein the audio data includes position information of a sound object;

acquiring first position information regarding virtual positions of the plurality of virtual speakers in the space and second position information regarding positions of the plurality of virtual speakers in the space perceived by a user; and correcting the first position information of at least one of the plurality of virtual speakers based on the second position information.

13. A terminal device, including an output unit configured to output output information based on an operation to move first position information to second position information, wherein the first position information is provided from an information processing apparatus and is related to a virtual position of a virtual speaker in a space, the second position information is related to a position of the virtual speaker in the space perceived by a user, the information processing apparatus corrects the first position information of at least one of a plurality of the virtual speakers that have rendered audio data, the first position information is corrected based on the second position information, and the audio data includes position information of a sound object.

* * * * *